United States Patent
Robertson et al.

(10) Patent No.: US 7,421,683 B2
(45) Date of Patent: Sep. 2, 2008

(54) METHOD FOR THE USE OF INFORMATION IN AN AUXILIARY DATA SYSTEM IN RELATION TO AUTOMATED TESTING OF GRAPHICAL USER INTERFACE BASED APPLICATIONS

(75) Inventors: Niel Robertson, Boulder, CO (US); Christopher L. Burton, Lafayette, CO (US); Thomas Guzik, Aurora, CO (US)

(73) Assignee: Newmerix Corp£, Superior, CO (US)

( * ) Notice: Subject to any disclaimer, the term of this patent is extended or adjusted under 35 U.S.C. 154(b) by 695 days.

(21) Appl. No.: 10/766,613

(22) Filed: Jan. 28, 2004

(65) Prior Publication Data

US 2005/0021289 A1    Jan. 27, 2005

Related U.S. Application Data

(60) Provisional application No. 60/443,030, filed on Jan. 28, 2003.

(51) Int. Cl.
*G06F 9/44* (2006.01)

(52) U.S. Cl. ................................................ 717/130
(58) Field of Classification Search ................ 717/120, 717/124, 111, 135; 707/3, 100; 715/704, 715/716; 714/33, 38; 719/313; 705/1
See application file for complete search history.

(56) References Cited

U.S. PATENT DOCUMENTS

| | | | |
|---|---|---|---|
| 5,790,117 A * | 8/1998 | Halviatti et al. | 715/744 |
| 6,311,320 B1 * | 10/2001 | Jibbe | 717/111 |
| 2003/0236775 A1 * | 12/2003 | Patterson | 707/3 |
| 2004/0041827 A1 * | 3/2004 | Bischof et al. | 345/704 |

\* cited by examiner

*Primary Examiner*—Tuan Anh Vu
(74) *Attorney, Agent, or Firm*—Cooley Godward Kronish LLP

(57) ABSTRACT

A system and method for using information in an auxiliary data system to enhance the capability of automated testing of graphical user interface (GUI) based applications. Embodiments of the invention establish a method to map auxiliary data to automated tests of the GUI in order to map out all tests that need to be created, which tests need to be changed as this auxiliary data changes, and how each automated test needs to be updated to handle these changes.

14 Claims, 5 Drawing Sheets

FIG. 2

DIALOGUE BOX
("REQUISITION ITEMS").OPEN()
58

| Requisition Items - Use - Requisitions |
|---|
| File Edit View Go Favorites Use Process Inquire Report Help |
| Requisition Form Requisition Schedule Header Comments Defaults Details |

Business Unit: 50100    Requisition ID: NEXT

Status: Open

Requester: Susan Miller

| Item ID | | | GSC Class | GSC it | Loc |
|---|---|---|---|---|---|
| Line | Requisition Quantity | | UOM | Price | |
| 1 | 2,0000 | | 600 | 21 | 10 |
| | | | EA | | 14 |

DIALOGUE BOX
("REQUISITION ITEMS").
TAB ("REQUISITION FORM")
58

DIALOGUE BOX
("REQUISITION ITEMS").
DROPDOWN ("REQUESTER").
SELECT ("SUSAN MILLER")
58

FIG. 3

COMPONENT: PS_REQUEST_PANEL
PAGE: PS_REQUEST_PANEL_START

UI ELEMENT: PS_RP_TAB_1

UI ELEMENT: PS_TEXTBOX_REQUESTER

FIG. 4

| EMPLOYEE | FIRST | LAST | CITY |
|---|---|---|---|
| | SUSAN | MILLER | NYC |
| | GARY | FRANK | DEN |

PSFT

Requisition Items - Use - Requisitions
File Edit View Go Favorites Use Process Inquire Report Help
Requisition Form Requisition Schedule Header Comments Defaults Details Business Unit: 50100    Requisition ID: NEXT Status: Open    Requester: Susan Miller

| Line | Item ID | GSC Class | GSC it | Loc |
|---|---|---|---|---|
| 1 | Requisition Quantity | UOM | Price | |
| | 2.0000 | 600 EA | 21 | 10 / 14 |

DIALOGBOX ("REQUISITION ITEMS").DROPDOWN ("REQUESTER").SELECT ("SUSAN MILLER")

US 7,421,683 B2

METHOD FOR THE USE OF INFORMATION IN AN AUXILIARY DATA SYSTEM IN RELATION TO AUTOMATED TESTING OF GRAPHICAL USER INTERFACE BASED APPLICATIONS

PRIORITY

The present application claims priority from commonly owned and assigned application No. 60/443,030, filed Jan. 28, 2003, entitled A Method for the Use of Information in an Auxiliary Data System in Relation to Automated Testing of Graphical User Interface Based Applications, which is incorporated herein by reference.

COPYRIGHT

A portion of the disclosure of this patent document contains material that is subject to copyright protection. The copyright owner has no objection to the reproduction by anyone of the patent disclosure as it appears in the Patent and Trademark Office patent files or records, but otherwise reserves all copyright rights.

FIELD OF THE INVENTION

The present invention relates generally to tools designed to help with application maintenance through the design, development, and deployment phases. More particularly, but not by way of limitation, the present invention relates to the process of testing application quality through automated user interface ("UI") testing.

BACKGROUND OF THE INVENTION

Automated testing is the process of repetitively and iteratively running through common user or use scenarios in an application to effectively test the known features, boundary conditions, expected application responses and underlying software code paths of the application. Technology to automatically replay user actions to simulate interaction with the application removes the requirement of having a human operator to run though the application repeatedly.

Automated testing can be performed on many types of software from imbedded systems to web-browser-based applications. Automated testing traditionally captures the actions of a user interacting with the user interface of an application through a recording process. The software monitors and recognizes user actions such as button clicks, mouse movements, entering text, and using navigation keys (such as the commonly used <TAB>, <ALT>, <ESC> keys). These actions are then "replayed" by the automated testing software. And as user interactions are replayed systematically, the automated testing software captures any changes in the way the application responds (such as unexpected graphical representations, inconsistent data returned or changes in workflow) and reports them to the automated test software user as possible defects in the application being tested.

To be able to replay a user's interaction with an application over and over again, the automated testing software must keep a script of the user actions. This script describes which actions a user has taken (button clicks, text entries, mouse movements, etc.) as well as the graphical interface objects the user has interacted with. A graphical interface object might be a textbox that accepts text entry, a button that can be clicked, a hyperlink in a web browser that directs the application to a new page, a dropdown list of values, or an application menu command. The script describes both what action was performed by the user and which object the action was performed on. Thus, when the script is "replayed", the automated testing software can reconstruct the user's actions as closely as possible.

Scripts are usually written automatically by the test recorder in a familiar contemporary programming language such as Visual Basic, Java, C++, or JavaScript. This resulting program code is exposed to the user of the automated testing system, providing a programmatic environment that the user of the automated testing system can take advantage of to add additional programmatic logic. It is not uncommon for automated testing software to extend the underlying programming language to incorporate commands to identify and manipulate graphical interface objects as well as mimic user interactions. The recorder uses these language extensions when automatically writing the script code during a recording session.

But problems exist with this current approach. To comprehensively test an application, a number of these scripts are created to test common features, functionality, logic paths, and programmatic logic of the application. Because these scripts reference graphical interface objects that existed while the original recording took place, they are very susceptible to changes in the application. That is, if a graphical interface object has changed (been renamed, replaced by a different type, a new object has been added, or workflow has changed), the references to the object in the original script may not work. Additionally, scripts are susceptible to changes in the underlying data structure of the application because they are only written at the user interface level (e.g. what UI objects have been interacted with).

If, for example, a UI object receives some data that will be stored in a database, and the definition of the type of data that can be stored in the database changes, the script will have no knowledge of this. This leads to entry of erroneous data in the application and potentially incongruous results during testing. The script may not be wrong at the UI level, but its lack of understanding of the underlying application effectively invalidates its accuracy. The only solution to such a set of problems is to replay all scripts that have been recorded and track down any obvious problems (scripts failing because a UI object that is referenced does not exist anymore) or indirect problems (underlying requirements for data changing). This turns out to be a very time consuming process for the automated test software user. For large software systems, the number of scripts required to comprehensively test an application can be very large. With a very large number of test scripts, maintenance of the tests themselves can be a complex and sizable task. Many times, maintenance of test scripts is the largest component of time involved in implementing automation.

Although present devices are functional, they are not sufficiently accurate or otherwise satisfactory. Accordingly, a system and method are needed to address the shortfalls of present technology and to provide other new and innovative features.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

The present invention can provide a system and method for using information in an auxiliary data system to enhance the capability of automated testing of graphical user interfaces. In one exemplary embodiment, the present invention can:

1) record user actions into a set of scripts;
2) correlate data from the auxiliary data system with graphical objects that have been interacted with;
3) store correlations alongside actual programmatic test scripts;
4) monitor changes to the auxiliary data; and
5) use this auxiliary data mapping (and any changes recognized in the auxiliary data) to facilitate a number of new features in automated testing.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

FIG. 2 is a screen shot of a UI with the UI elements labeled.

FIG. 3 is a screen shot of a UI with the auxiliary data labeled.

FIG. 4 illustrates the correlation between the UI elements and the auxiliary data;

DETAILED DESCRIPTION

One embodiment of the present invention captures auxiliary data (sometimes called "meta data") about a user interface, data requirements, and expected functionality of an application in order to advance the way automated tests are planned, created, and maintained. Many times this auxiliary data is an integral part of the tested application's design and may describe how the final application should be rendered in the user interface and what data is acceptable to be input into the system. Generally, most applications use this architecture in one form or another to efficiently abstract data from the display. More particularly, but not by way of limitation, a contemporary class of applications called "packaged applications" use this architecture extensively (by way of example, vendors in this class would include PeopleSoft, SAP, Siebel, Oracle, JD Edwards, Lawson, and I2).

Auxiliary data can be captured through any reference mechanism such as a database, flat files, API, shared memory segment, or web service as long as the underlying application stores such information. One embodiment of the present invention correlates this auxiliary data with the final graphical interface objects, application properties, functionality, data requirements, and/or workflow. This embodiment then determines which recorded automated test scripts reference the elements, data, or functionality described by the auxiliary data. And, by examining the auxiliary data and also watching for any changes in this auxiliary data set, this embodiment of the invention can determine which automated tests need to be created, updated, removed or otherwise changed.

Figure 1:
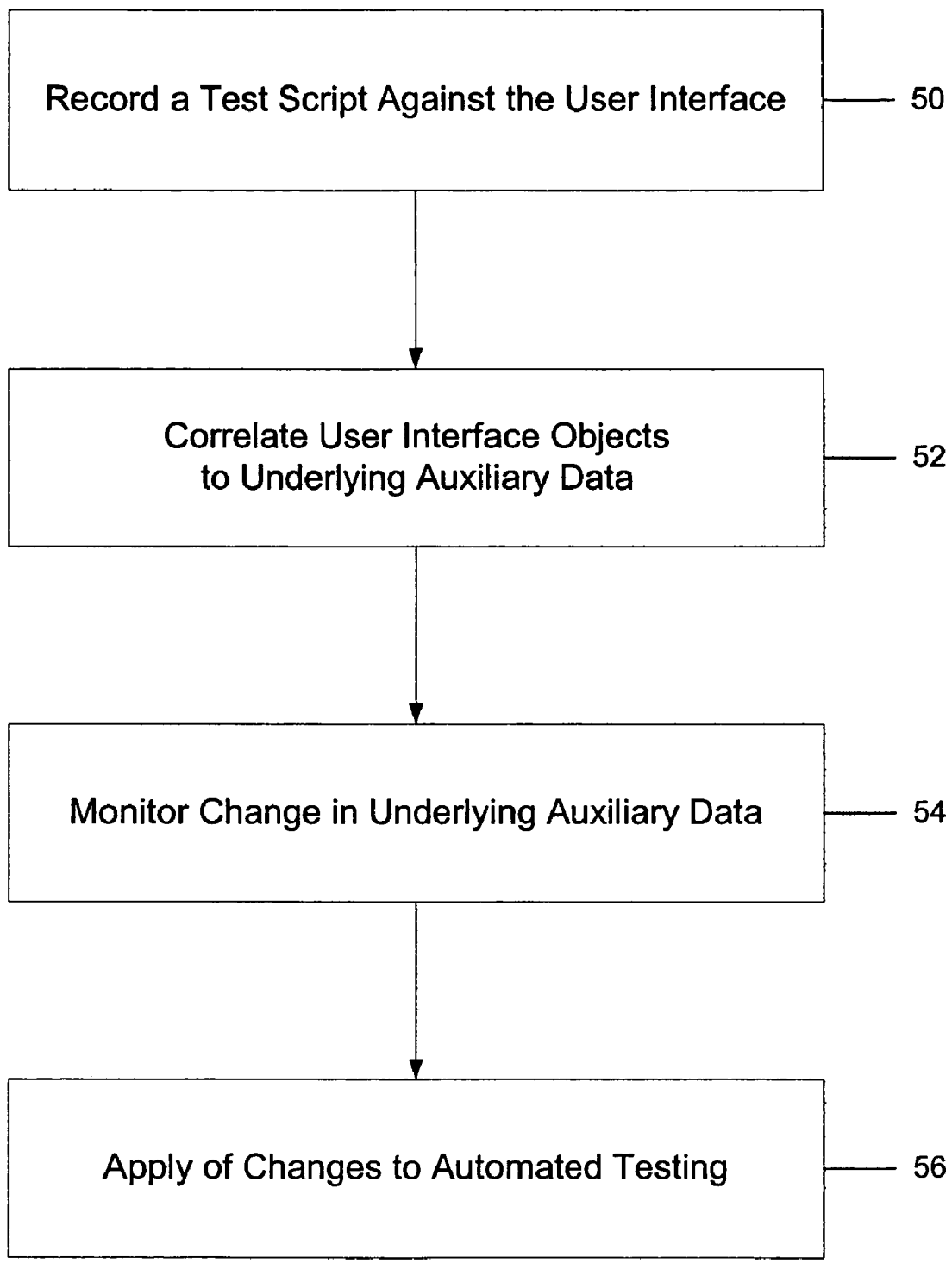
FIG. 1 is a block diagram of one embodiment of the present invention.

Referring now to the drawings, where like or similar elements are designated with identical reference numerals throughout the several views, and referring in particular to FIG. 1, it is a flow chart of one embodiment of the present invention. This embodiment includes four parts: (1) the recording of a test script against the user interface (Block 50), (2) the correlation of user interface objects to underlying auxiliary data (Block 52), (3) the monitoring of change in underlying auxiliary data (Block 54), and (4) the application of these changes to automated testing (Block 56). Other embodiments do not include all four steps and yet other embodiments add additional steps. Each of these actions is described in greater detail below.

Recording a Test Script Against the User Interface

As previously described, an automated test of a graphical user interface can be represented by a script. In general terms, this script can be a manual set of actions (testing can be performed repetitively by a human user as well) or a script designed to be replayed by a piece of automation software. An automation test script is an interpretable piece of code that can be replayed by software equipped to interpret and execute this code. This script can be coded in a number of formats or languages but is usually stored in a common contemporary programming language such a Visual Basic, Java, or C++. Regardless of language format, there is usually the capability in the script's language to reference UI elements, recreate user actions, and manage application test workflow in a way that the original recording can be replayed programmatically. Test scripts are usually stored as files on a disk or saved in a central repository for team development.

Some embodiments of the present invention use common techniques to record, write test scripts, and replay user actions with an application. These techniques work with traditional desktop applications as well as applications derived through web browsers or other common application presentation tools.

Correlation of User Interface Objects to Underlying Auxiliary Data

Many applications (including ERP systems, CRM systems, and Web-based systems) contain auxiliary data about the way the application works. This descriptive data may include (but is not limited to):

Multiple different definitions of the UI structure (such as the name, type, and location of all user interface objects to be presented in the application).

A definition of where data presented in the interface is retrieved from (such as a list of information retrieved from a specific database record).

A description of workflow in the application (the multiple steps at the graphical layer a user would need to take to complete a "process" in the application).

Descriptions of aesthetic or programmatic customizations made to the application.

Descriptions of external APIs or systems connected into the application.

Descriptions of versions of the application, interface, configurations, or application data This information is commonly stored in several formats, including database systems, file systems, application protocol interface captures, Web services, etc. Four of these systems are described below.

Database Systems

In many large systems much of the data (both application data as well as auxiliary data about the application itself) is stored in an underlying database. The invention uses all auxiliary data in the database that describes the functionality, aesthetic, configuration or workflow of the system.

TABLE 1

Example Database Tables with Relevant Auxiliary Data

Table - PANEL_WORKFLOW

| PANEL_ID | ELEMENT | NEXT_PANEL_ID |
|---|---|---|
| 1 | OK_BUTTON | 2 |
| 1 | HELP_BUTTON | 3 |
| 2 | HELP_BUTTON | 3 |

Table - PANEL_EVENTS

| PANEL_ID | ELEMENT | EVENT_TYP | EVENT_CODE |
|---|---|---|---|
| 1 | NONE | PANEL_LOAD | (code segment . . . ) |
| 1 | OK_BUTTON | CHECK_VALUES | (code segment . . . ) |

Table - PANEL_ELEMENTS

| PANEL_ID | ELEMENT | ELEMENT_TYPE | DB_TABLE | DB_COLUMN |
|---|---|---|---|---|
| 1 | EMP_NAME | TEXT_BOX | EMPLOYEE | FIRST_NAME |
| 1 | EMP_DEPT | DROP_DOWN | ORG_STRUCT | DEPARTMENTS |

File Systems

In replacement of (or in addition to) a database system, many applications contain auxiliary application data in a set of additional files. These files can be formatted in many ways. The files may be used in the process of creating or displaying the user interface or may define report parameters that the application uses to display information to the user. These parameters can be important information about the final displayed result to the user through the application or even tie directly back into which elements in a database to report on.

TABLE 2

Example File Referencing Database Elements

// Report parameters for customer relationship application
report name = example report
report time period = last seven days
report x-axis = DATABASE.CUSTOMER_ACCOUNT
report y-axis = DATABASE.BILLING_PER_DAY Application Programming Interfaces (API)

Many times, auxiliary data about a system can be captured by querying the application through a known programming interface. The information returned can be similar to the data from a direct database query of a data file.

Web Services

Similar to an application programming interface, some applications supply web-based services that when queried will return similar information about the application such as a database, data file, or API.

In many applications, this underlying auxiliary data is the source for the final UI display. The auxiliary data may describe the layout of the screen, the types of UI elements (textboxes, dropdown lists), where data entered into the application will reside in the underlying data system, data processing code, and underlying workflow of the application as a user navigates from screen to screen. In the UI generation process, the underlying application generally tags elements in the user interface in such a way that data returned from the UI to application can be recognized. Thus, each user interface element can be identified by its tag and this tag can be mapped back to the underlying auxiliary data representation. The invention captures these mappings and integrates them with the recording process. When a user is navigating an application, each UI element interacted with is recognized both at the UI level (e.g., how to identify the object through the interface API) as well as the underlying auxiliary data that generated the UI element. Just as a script is generated that references the user interface objects, a repository of auxiliary data mappings can be created as well.

For example purposes, Table 3 sets forth a generic test script to enter data into the dialogue box and submit it to the application. The response from the application (in another dialogue box or screen that would appear) would appear in the elements at the bottom of the dialogue. These results would be checked against expected results.

TABLE 3

Example Script for Automated Test

// identify the dialogue box and open it
DialogueBox("Requisition Items").Open( )
DialogueBox("Requisition Items").Tab("Requisition Form").Select( )
// select a value from the drop down box
DialogueBox("Requisition Items").DropDown("Requester").Select("Susan Miller")
// check the results on the returned screen
resultID = DialogueBox("Requisition Items").TextBox("Item ID").GetValue( )
resultRQ = DialogueBox("Requisition Items").TextBox("Requisition Quantity").GetValue( )
If resultID != 999 then Print("Error with Item ID")
If resultRQ !=999 then Print("Error with Requisition Quantity")

The resulting script identifies the UI elements on the screen and writes them into the test script. FIG. 2 illustrates an example. The scripts for the UI elements are represented by references number 58.

At the same time the script generates the UI specific identifiers, the invention also keeps track of the underlying auxiliary data that generated the UI elements as well as all of their properties. FIG. 3 illustrates the auxiliary data at reference number 60. Each underlying auxiliary data source has a number of properties associated with it which will depend on the type of source data. For example, the COMPONENT may describe a set of pages in a logical workflow in the application. The valid properties for a COMPONENT may be a list (and order) of all PAGES in the workflow. A PAGE may describe all the UI elements that appear on it as well as any custom code that manages data manipulation such as sorting or formatting. A UI ELEMENT would describe the object type (textbox, dropdown, tab, button, etc.) as well as the destination database table for entered data and this database field's type and length. The auxiliary data types of their specific properties may be custom to each application.

As users interact with UI objects, their underlying auxiliary data tags are discovered and the auxiliary data that generated them are stored in an additional file along with the script. The invention uses the XML data format to allow flexibility in which auxiliary data types are present, their individual properties, and the current value of each of their properties.

```
<DEFINE PS_REQUEST_PANEL>
    <TYPE> COMPONENT </TYPE>
    <SOURCE> DATABASE:PS_HRMS8.8 </SOURCE>
    <PAGE> PS_REQUEST_PANEL_START </PAGE>
    <PAGE> PS_REQUEST_PANEL_DETAILS </PAGE>
    <VERSION> 1.3.2 </VERSION>
    <LAST-MODIFICATION> 01/24/04 11:22:33 </LAST-
    MODIFICATION>
</DEFINE>
<DEFINE PS_REQUEST_PANEL_START>
    <TYPE> PAGE </TYPE>
    <SOURCE> DATABASE:PS_HRMS8.8 </SOURCE>
    <UI_ELEMENT> PS_TEXTBOX_REQUESTER </PAGE>
    <VERSION> 1.3.1 </VERSION>
    <LAST-MODIFICATION> 01/24/04 11:01:33 </LAST-
    MODIFICATION>
</DEFINE>
<DEFINE PS_TEXTBOX_REQUESTER>
    <TYPE> UI ELEMENT </TYPE>
    <SOURCE>    DATABASE:PS_HRMS8.8:    PS_
    REQUESTER_TABLE:
REQUESTER_NAME </SOURCE>
    <DB_TYPE> CHAR </TEXT>
    <DB_LENGTH> 256 </DB_LENGTH>
    <LAST-MODIFICATION> 01/24/04 09:01:33 </LAST-
    MODIFICATION>
</DEFINE>
```

After the recorder generates the script to reference the UI object and the invention captures the current information about the underlying auxiliary data, the two items can effectively be correlated together. FIG. 4 illustrates this correlation. It should be noted that embodiments of the invention include the ability to capture both explicit UI objects being interacted with (e.g., objects where text is entered or buttons being clicked) as well as implicit objects such as the environment of the page or UI elements that are not interacted with but provide default values. This is important because a test script can rely on UI element default settings to work properly even if the element has not been directly interacted with. In the example shown, even if the "Status" dropdown is not manipulated by the user during recording, it is implied that the value "Open" is selected. The need to record the auxiliary data value for this UI element is the same as if the user has selected the dropdown in the UI and picked the "Open" entry explicitly.

Monitoring Change in Underlying Auxiliary Data

Once the auxiliary data mapping files have been created, the invention can find changes in the underlying auxiliary data that may affect the functionality of a test script. If the auxiliary data that generates a user interface element has changed, the script may not work any longer if the UI reference has become invalid because of this change. By comparing the values in the auxiliary data mapping file to existing values in the auxiliary data system containing current auxiliary data information (e.g., a database) a list of all changes can be made. Once the list of changes is identified, the invention can organize changes into categories that describe how the test script might be affected.

For example, if an auxiliary data representation of a PAGE has a number of UI_ELEMENTS removed from it, a test script that references those removed objects will not function properly. Additionally, if the auxiliary data representation of a dropdown box has a new default value, a test script which depends on this default value may enter erroneous information into the application. Embodiments of the invention categorize the changes, correlates them back to the test script that has been written and lets the user of the automated testing software decide how to update their test scripts to comply with any changes that have been made in the auxiliary data.

Once the objects are defined and equated, a complete list of objects from the auxiliary data system can be created. This list of objects is called the object repository (OR). This OR is used as the baseline and reference version. Once this baseline reference version is created, a continual scan is set up of the objects in the auxiliary data source. As objects change, they are recorded as new versions in the OR. Each time a change is made to an object, the associated test scripts are flagged for change. With the change information from the OR, three types of actions on the test script set can be managed: adding new scripts, maintaining existing scripts, removing existing scripts.

Application of Changes to Automated Testing

A number of uses for the invention are listed below to illustrate how the technical solution manifests itself into automated test software. Typical uses involve test planning and maintenance, both of which are described below.

Use of the Invention for Test Planning

Before ever recording a test script, the auxiliary data source can be queried for all auxiliary data types of interest. This could include screens, pages, UI elements, etc. This catalogue of all objects can be used to create a skeleton test plan for the automated testing user. Using this test plan, the user can record test scripts to ensure that every relevant auxiliary data source object has a test written against it. This provides a simple coverage mechanism for the user to understand exactly what test scripts need to be recorded to fully test the underlying application which will be generated from its auxiliary data.

TABLE 4

Example Test Plan Outline Generated From Auxiliary Data

| | | |
|---|---|---|
| DATABASE:Human Test | Resources:COMPONENT: New | Employee:PAGE: Smoke |
| DATABASE:Human Code:Panel Load | Resources:COMPONENT: New | Employee:CODE: Event |
| DATABASE:Human Code:Verify Data | Resources:COMPONENT: New | Employee:CODE: Event |
| DATABASE:Human | Resources:COMPONENT: New | Employee: BUTTON: Submit Form |

Use of the Invention for Test Maintenance

As a set of tests (scripts in our example) are created to cover all the functionality of a software application the need to maintain and update the scripts increases. There are three main ways the script base is maintained:

1) New scripts are added to the script set to cover new functionality.
2) Existing scripts are updated to reflect changes in the UI elements tested, the data entered or examined, or workflow of the application.

Scripts are removed when the functionality or elements they are testing become obsolete.

Add New Scripts to Cover New Functionality

As the auxiliary data changes show new objects in the system (components, page, and individual UI elements) the automated test user can be prompted to create a new test for the new object.

Modify Existing Scripts

As changes are identified in the auxiliary data, all scripts that are equated to those objects will be flagged. The automated test software user can choose to update the test script based on the type of change to the object. Also, new objects may appear on a UI. These changes will be flagged for the testing user as well as in case they are interested in adding them to the test script.

Removal of Scripts

Many times, objects are removed from the system. Using the OR, all objects that are removed are tied to test scripts as well. If an object is removed, the related test script can be augmented or removed altogether.

Figure 5:
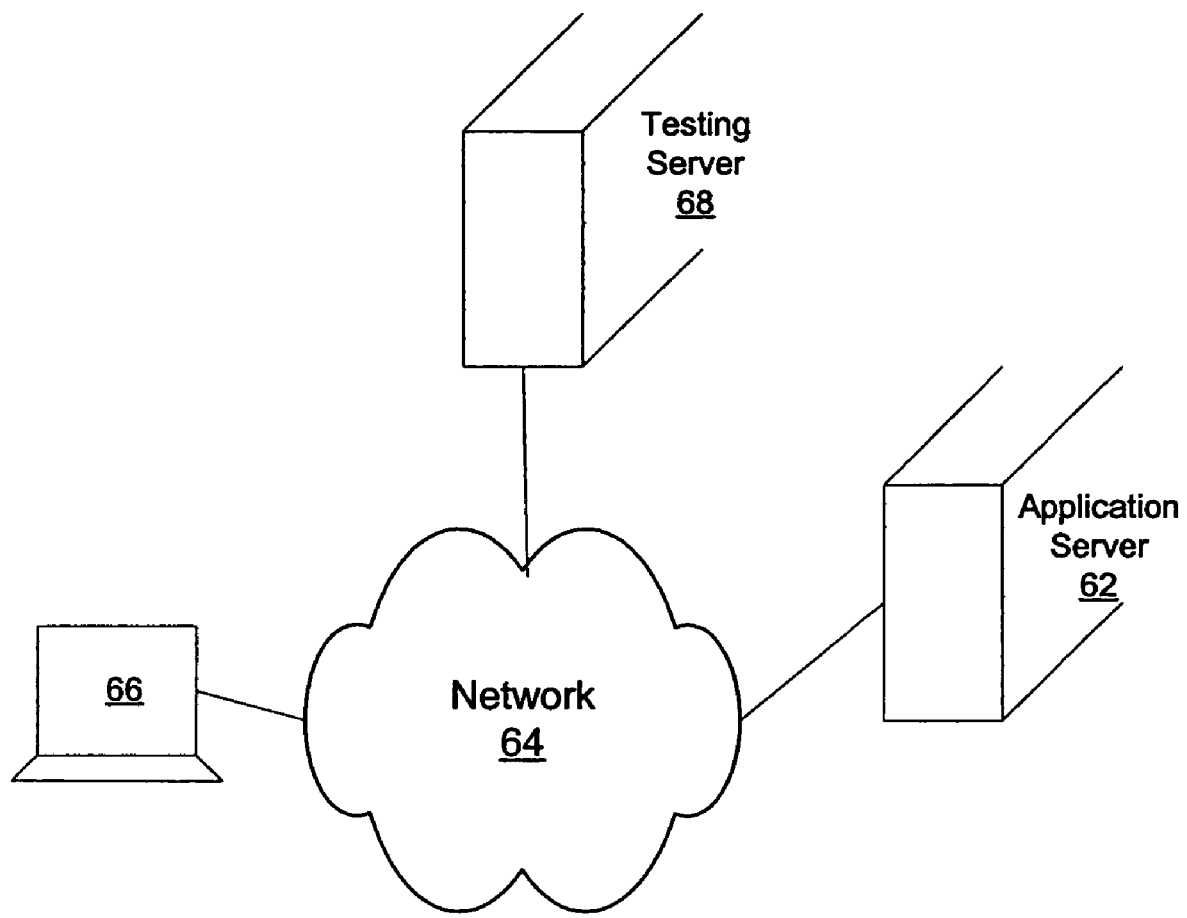
FIG. 5 illustrates one embodiment of a system constructed according to the principals of the patent invention.

FIG. 5 illustrates one system constructed according to the present invention. This embodiment includes an application server 62 connected through a network 64 to a user 66 and a testing server 68. These devices can be of any computer architecture. Additionally, the devices can be integrated in some embodiments.

In conclusion, the present invention provides, among other things, a system and method for using information in an auxiliary data system to enhance the capability of automated testing of graphical user interface (GUI) based applications. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for identifying required updates of test scripts used to test an application, the method comprising:
   capturing auxiliary data items associated with the application, the auxiliary data items including information about how the application works, the auxiliary data items including information regarding at least one of: a layout of a screen; the types of user-interface elements used by the application; where data entered into the application will reside in an underlying data system; data processing code; and an underlying workflow of the application as a user navigates from screen to screen;
   recording one or more test scripts, each test script corresponding to a user's interactions with the application;
   correlating the captured auxiliary data items with at least one of user interface objects, properties, functionality, data requirements, and workflow associated with the application to generate mapping data by identifying a tag associated with a user interface object with which the user interacts while operating the application and by mapping the tag to a corresponding auxiliary data item;
   determining, from the mapping data, which test scripts reference each user interface object, property, functionality, data requirement, or workflow and storing information indicating which test scripts reference each user interface object, property, functionality, data requirement, or workflow;
   determining that one of the auxiliary data items has been altered, the alteration of the one of the auxiliary data items indicating a particular manner in which the application has been altered;
   consulting the stored information to identify test scripts that reference a user interface object, property, functionality, data requirement, or workflow corresponding to the altered one of the auxiliary data items; and
   reporting the identified test scripts to a user.

2. The method of claim 1, wherein the recording includes recording default values relied upon by the application during the user's interaction with the application, the default values being included with the test script.

3. The method of claim 1, wherein the recording includes recording auxiliary data items corresponding to the user's interaction with the application.

4. The method of claim 1, wherein the correlating is performed in conjunction with the recording.

5. The method of claim 1, wherein capturing auxiliary data items associated with the application includes querying a database that includes auxiliary data associated with the application.

6. The method of claim 1, wherein capturing auxiliary data items associated with the application includes querying an auxiliary data file that includes auxiliary data associated with the application.

7. The method of claim 1, wherein capturing auxiliary data items associated with the application includes calling an Application Programming Interface (API) that returns the auxiliary data items.

8. The method of claim 1, wherein capturing auxiliary data items associated with the application includes querying a Web service that returns the auxiliary data items.

9. The method of claim 1, wherein storing information indicating which test scripts reference each user interface object, property, functionality, data requirement, or workflow includes:
   storing a record of each auxiliary data item and the test scripts that reference the user interface object, property, functionality, data requirement, or workflow to which that auxiliary data item corresponds.

10. The method of claim 1, wherein determining that one of the auxiliary data items has been altered includes comparing the mapping data with current auxiliary data associated with the application.

11. The method of claim 1, further comprising:
   prompting a user to generate a new test script to test a user interface object, property, functionality, data requirement, or workflow corresponding to the altered one of the auxiliary data items.

12. The method of claim 1, further comprising:
   prompting a user to alter a test script to test a user interface object, property, functionality, data requirement, or workflow corresponding to the altered one of the auxiliary data items.

13. The method of claim 1, further comprising:
   prompting a user to remove a test script referencing at least one of user interface objects, properties, functionality, data requirements, and workflow that have been deleted from the application based on a determination that corresponding auxiliary data items have been deleted from a source of current auxiliary data associated with the application.

14. A system for managing test scripts used to test an application, the system comprising:
   a processor;
   a memory device; and
   a plurality of instructions stored on the memory device, the plurality of instructions configured to cause the processor to:
      capture auxiliary data items associated with the application, the auxiliary data items including information about how the application works, the auxiliary data items including information regarding at least one of: a layout of a screen; the types of user-interface elements used by the application; where data entered into the application will reside in an underlying data system; data processing code; and an underlying workflow of the application as a user navigates from screen to screen;

record one or more test scripts, each test script corresponding to a user's interactions with the application;

correlate the captured auxiliary data items with at least one of user interface objects, properties, functionality, data requirements, and workflow associated with the application to generate mapping data by identifying a tag associated with a user interface object with which the user interacts while operating the application and by mapping the tag to a corresponding auxiliary data item;

determine, from the mapping data, which test scripts reference each user interface object, property, functionality, data requirement, or workflow and store information indicating which test scripts reference each user interface object, property, functionality, data requirement, or workflow;

determine that one of the auxiliary data items has been altered, the alteration of the one of the auxiliary data items indicating a particular manner in which the application has been altered;

consult the stored information to identify test scripts that reference a user interface object, property, functionality, data requirement, or workflow corresponding to the altered one of the auxiliary data items; and report the identified test scripts to a user.

* * * * *